United States Patent

Martin

[15] 3,677,071

[45] July 18, 1972

[54] METHOD AND APPARATUS FOR DETERMINING THE COEFFICIENT OF DIFFUSION OF A DISSOLVED SOLUTE IN UNSATURATED SOLUTION

[72] Inventor: Arthur Seymon Martin, 2316 French St., Santa Ana, Calif. 92706

[22] Filed: Nov. 12, 1970

[21] Appl. No.: 88,846

[52] U.S. Cl. ..........................73/61.4, 73/61.1 R, 324/30 R, 324/65 R
[51] Int. Cl. ......................................................G01n 27/06
[58] Field of Search ..........................73/61.4, 61 R, 61.1 R; 324/30 R, 65 R; 233/1 R

[56] References Cited

UNITED STATES PATENTS 3,189,268   6/1965   Nilsson...............................233/1 R X
3,009,388   11/1961  Polanyi....................................73/61.4
3,460,749   8/1969   Martin....................................233/1 R

FOREIGN PATENTS OR APPLICATIONS 1,214,144   11/1959   France....................................73/61.4

Primary Examiner—Louis R. Prince
Assistant Examiner—Joseph W. Roskos
Attorney—Allen A. Dicke, Jr.

[57] ABSTRACT

Unsaturated dissolved solute remains in solution by means of diffusion forces. These forces can be determined by centrifugation, by measuring the concentration of the dissolved solute in one part of the solution, and noting the minimum amount of centrifugal force which causes a concentration change. Concentration measurement can be made by any convenient method and, where different concentrations result in different electrical conductivity, resistance measurements are convenient.

3 Claims, 3 Drawing Figures

PATENTED JUL 18 1972 3,677,071
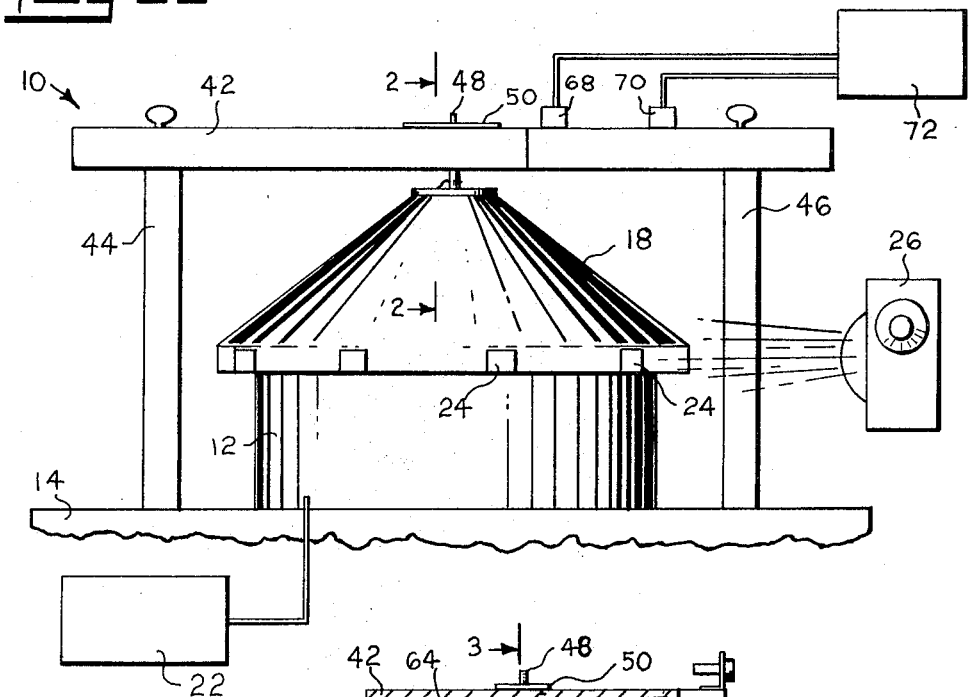
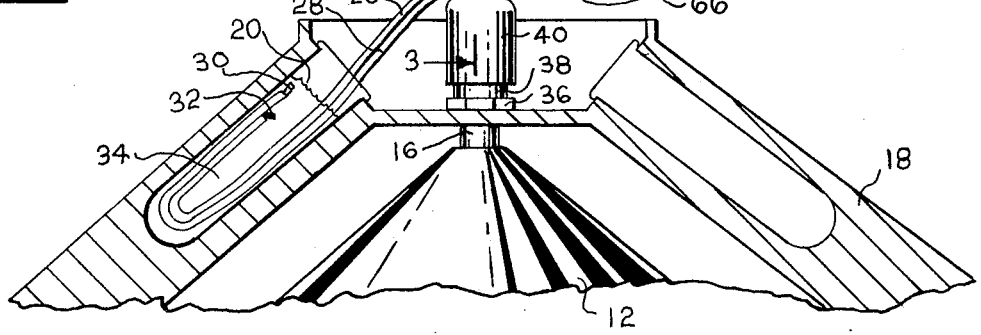
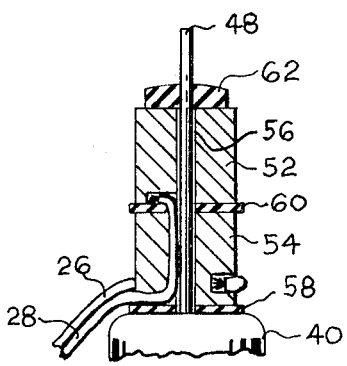
INVENTOR;
ARTHUR SEYMON MARTIN
BY;
ALLEN A. DICKE, JR.,
AGENT

METHOD AND APPARATUS FOR DETERMINING THE COEFFICIENT OF DIFFUSION OF A DISSOLVED SOLUTE IN UNSATURATED SOLUTION

BACKGROUND

This invention is directed to a method and apparatus for determining the coefficient of diffusion of an unsaturated solution by centrifuging at different accelerational forces to determine the minimum force level at which changes in concentration result.

As is disclosed in his prior U.S. Pat., No. 3,460,749, the inventor has discovered that unsaturated solutions of a solute in a solvent have diffusion force which can be overcome by the application of an external force. This discovery is related to the theory that there is some free solvent, that is not directly associated with solute, in an unsaturated solution. This indicates loose attachment between the solvent and dissolved solute and, as long as the solution is unsaturated, the application of external force moves the dissolved solute among the solvent. This is based on the presumption that the force applied is above the force tending to randomly disperse the dissolved solute in the solution. The dispersion force is a function of intermolecular collisions which, in turn, are a function of temperature. Furthermore, the solvent and solute molecules must be such that an externally applied force works differently thereon, that is, that they are of different density, for instance.

The term "coefficient of diffusion" is used throughout this specification. It is defined as the minimum accelerational force at a particular temperature which causes a change in concentration of one part of an unsaturated solution, by force-imposed motion of the solute.

There are a number of present-day theories of the structure of pure water. Since the structure of pure water is not fully understood, it is also self-apparent that the system of a solute in water is not fully understood. Water solutions are those of greatest significance in the present-day industrial and economic world and, for the most part, they lend themselves well to separation into portions having a concentration gradient therebetween by the application of centrifugal force. The concept of a dissolved solute molecule moving through an unsaturated solvent lends itself well to the space-packing theory of water. However, irrespective of whether future scientific findings prove the validity of the space-packing theory, or other water structure theory, the experimental studies which have shown the development of concentration gradients in unsaturated solutions cannot be upset. Thus, there is no great need to consider the various theories of the structure of water, because the present method and apparatus is based on discovery and research data, rather than application of a particular theory.

SUMMARY

In order to aid in the understanding of this invention, it can be stated in essentially summary form that it is directed to a method and apparatus for determining the coefficient of diffusion of a dissolved solute in an unsaturated solution. This is accomplished by successively centrifuging an unsaturated solution at successively lower centrifugal force values, and determining concentration differences due to the application of centrifugal force, until the low level of centrifugal force which results in a concentration change is determined.

Accordingly, it is an object of this invention to provide a method and apparatus for determining the coefficient of diffusion of a dissolved solute in an unsaturated solution by the successive application of centrifugal force at different values.

BRIEF DESCRIPTION OF THE DRAWINGS

FIG. 1 is a side-elevational view of the apparatus for determining the diffusion coefficient of a solute in unsaturated solution, with some parts shown schematically.

FIG. 2 is an enlarged partial section taken generally along the line 2—2 of FIG. 1.

FIG. 3 is a further enlarged partial section taken generally along the line 3—3 of FIG. 2.

DESCRIPTION

In FIG. 1, the apparatus for determining the coefficient of diffusion of the solute in an unsaturated solvent is generally indicated at 10. Centrifuge motor 12 is mounted upon base 14. Extending out of the top of motor 12 is centrifuge shaft 16, see FIG. 2, upon which is mounted centrifuge rotor 18. At least one chamber 20 is positioned on rotor 18, away from its rotational axis, so that the contents of the chamber are subjected to centrifugal force when the rotor is rotated. In FIG. 2, the chamber is illustrated as being a test tube which lies at an angle with respect to the vertical so that radial centrifugal forces act, at least partially, along the length of the chamber. The particular angle of the longitudinal axis of the chamber 20 from the axis of rotation of rotor 18 is 52°. This angle will depend on the particular equipment used, and the equipment is preferably arranged so that the chamber is generally aligned with the direction of the net force. An additional balancing chamber can be provided, if desired, as shown.

Power supply 22 supplies power to motor 12 to control the speed of motor 12. As is discussed in more detail with respect to the process described below, the speed of rotation is controlled for precise determinations in accordance with this method. Feedback from a speed-detecting device to the power supply can be incorporated to maintain a constant preselected speed and, as is well-known in the motor speed control art. In the present instance, indicia 24 are spaced around the circumference of rotor 18, and are observed under strobe light 26 in order that rotative speed of the centrifuge rotor can be accurately established.

It is convenient to determine the concentration of the solute in the solvent in the chamber 20 during centrifugation. This is a time-saving convenience, as well as an accuracy-sustaining feature. The transfer of liquid from the chamber to another location of concentration determination after centrifugation may result in contamination or dilution which would influence the accuracy of results. Thus, it is desirable to equip the chamber 20 with concentration determining instrumentation. In the specific preferred example disclosed, the concentration of the solute in the solvent at a particular point in chamber 20 can be established by electrical connection. Particularly, it can be established by inter-electrode resistance. Thus, two wires 26 and 28 are brought to the chamber 20. These wires are insulated along their length to prevent electrical inter-connection with other parts or materials, except where desired. As is seen in FIG. 2, the ends 30 and 32 of wires 28 and 26, respectively, are stripped in order to expose the wire conductor and to permit it to be an electrode in the solution in chamber 20. The solution is generally indicated at 34.

In order to bring the electrical connection of wires 26 and 28 to a non-rotating location, so that the electrical characteristics of the solution between the electrode ends 30 and 32 can be established, a rotating connection is provided.

FIGS. 2 and 3 illustrate this rotating connection in more detail. In FIG. 2, nut 36 engages over the top of the central web of rotor 18, and around the shaft, to clamp the rotor onto the shaft. Above nut 36 is located resilient washer 38. Above resilient washer 38, nut 40 is screwed onto the top of shaft 16. The threads of nut 40 are somewhat loose upon shaft 16, and the resilient washer 38 is provided so that alignment of the rotating electrical connection, independent of concentricity of shaft 16 or its threads, can be accomplished.

Bridge 42 is mounted upon standards 44 and 46 above the centrifuge rotor. As is seen in FIGS. 1, 2 and 3, pilot shaft 48 (which is actually an elongated segment of nut 40), extends upward from nut 40 and bears in bearing plate 50 on bridge 42. Thus, pilot shaft 48 runs concentrically to its own axis, independently of the concentricity of the threads on the upper part of shaft 16.

Referring to FIG. 3, rings 52 and 54 are mounted over insulating tube 56 on pilot shaft 48. Furthermore, rings 52 and 54 are separated from each other and from nut 40 by means of insulating washers 58 and 60. Nut 62, which retains the stack of rings and insulating washers on pilot shaft 48, may be of insulative character or can have an insulator thereunder. This figure illustrates how the two rings 52 and 54 are electrically separated from the remainder of the rotating structure. If desired, one can be grounded on rotor 18, but electrical separation is considered superior to reduce the spurious background signals to the instrumentation. As is seen in FIG. 3, wire 28 passes around the back of ring 54 and is electrically secured thereto. Wire 26 passes through an upwardly-directed hole in ring 54 and through washer 60 to be electrically connected to ring 52. Thus, the electrodes are separately electrically connected to the two rings.

FIG. 2 illustrates the bridge 42 passing over the top of the centrifuge rotor. Mounted upon the bridge are brushes 64 and 66 which respectively engage upon the rings 52 and 54. The brushes are respectively connected to terminals 68 and 70, see FIG. 1, which are, in turn, connected to the instrument 72. Instrument 72 is a solute concentration determining instrument. In this specific case, it is a resistance measuring device which measures the resistance between electrodes 30 and 32 through the solution. This is a function of the concentration for certain solutions.

As stated above, the process for determining the coefficient of diffusion of the solute in an unsaturated solvent in accordance with this invention comprises determining a function of the concentration of the solute in the solvent at decreasing amounts of separating forces applied to the solution so that the lower limit force is established. The examples given below are for a sea water solution, and the test for concentration salts is by the resistivity of the solution between the spaced electrodes. However, with specific ion electrodes, concentrations of different ions can be individually determined. For example, the principal ions in sea water are sodium and chloride. HOwever, there are other useful ions in sea water for which the coefficient of diffusion can be established by suitably sensitive concentration measuring equipment and specific ion electrodes. For example, the coefficients of diffusion of uranium, gold, silver, aluminum, magnesium, and other metal ions in sea water can be established. When the coefficient of diffusion of a particular ion is established, and it is found that it is different from the coefficient of diffusion of other ions, it is clear that separation into fractions having greater concentration of a particular ion can be obtained by applying the amount of force which is between that established for different ions.

As a specific example, Pacific Ocean sea water was placed in a test tube in the centrifuge. The electrode ends 30 and 32 were spaced ⅜ inch apart. The solute concentration determining instrument 72 was an ordinary ohmmeter. The solution was centrifuged for 15 minutes, at different rotative speeds, as given in the table below, to result in the data given below. Higher values of instrument reading indicate lower solute concentration. Solution temperature during test was 88° F. Concentration reading without centrifugation was 140.

In the table, the net force on the solution is the resultant force from the radially applied centrifugal force and the 1 g vertical natural gravity force. The fact that the chamber is directed 52° from the vertical makes it rather in alignment with the net force, so that separation generally takes place along the length of the chamber.

TABLE I

| Test NO. Speed RPM | Radial Force | Net Force | Concentration Reading |
|---|---|---|---|
| 1   130 | 1.04 g | 1.44 g | 1000 |
| 2   125 | 0.96 | 1.41 | 700 |
| 3   110 | 0.74 | 1.25 | 400 |
| 4   100 | 0.61 | 1.17 | 300 |
| 5    90 | 0.50 | 1.12 | 140 |

This data shows that no decrease in concentration occurs below a value between 1.12 and 1.17 g. At 1.12 g in Test 5, there was no decrease in concentration, for the concentration reading of 140 is the same as for no application of force. Test 4 shows some decrease in concentration. The actual value net force which causes separation, which is the coefficient of diffusion of the solute in an unsaturated solution, in accordance with this invention, can be interpolated between the two bottom values by plotting a curve. Such a curve shows that this lower value is very close to the 1.12 g of Test No. 5.

In the example given, the salt concentration at the test point decreased. When the ion concentration testing electrodes are toward the axis end of the chamber, this shows that the dissolved ion is heavier and moves away from the axis during application of centrifugal force. If desired, the ion electrodes can be positioned in the chamber 20 away from the axis, rather than toward the axis, as shown.

When small electrodes are used, buildup of electrolysis products must be avoided. To this end, test equipment which employs minimum current is desirable. Thus, cathode follower or emitter follower circuits are desirable in the instrumentation. Alternatively, reversal of polarity to overcome electrolysis products buildup is useful.

It is clear that the process and apparatus of this invention are useful in determining the lower limit of force which changes the concentration of a solute in an unsaturated solvent. Furthermore, the changes in concentration versus the amount of force and versus the amount of time can be employed to calculate the economics of separation machinery which operates at above the minimum force values. Thus, force versus the amount of concentration change is easily tested for and obtained so that the economics of capital equipment is established.

This application having been disclosed in its preferred embodiment, it is clear that it is susceptible to numerous modifications and embodiments within the ability of those skilled in the art and without the exercise of the inventive faculty.

What is claimed is:

1. The method for determining the coefficient of diffusion of a solute in an unsaturated solvent comprising the steps of:
    applying a first force of determined amount for a first length of time to an unsaturated solution; and thereafter
    determining the concentration of the solute in the solvent toward one end of the solution in the direction of applied force; and
    repeating these steps successively with lesser amounts of force for substantially the same length of time until no further change in concentration of solutes in one end of the solution occurs as a result applying of the force.

2. The process of claim 1 where the force is applied at the time a solute concentration determination is made.

3. An apparatus for the determination of the coefficient of diffusion of a solute in an unsaturated solvent comprising:
    a centrifugal rotor mounted for rotation about an axis, chamber means on said centrifugal rotor;
    drive means for rotating said centrifugal rotor for driving said chamber means for applying an accelerational force to said chamber means in addition to the force of gravity, said drive means being adjustable so that the amount of force applied through the unsaturated solution in the chamber means can be preselected;
    measuring means comprising at least one electrode positioned within said chamber means for measuring the concentration of solute in the unsaturated solution toward one end of the chamber means generally along the direction of the applied force, said electrode being connected to a solute concentration-determining instrument, said rotor carrying at least one slip ring thereon and said at least one electrode is connected to said slip ring, a brush in engagement with said slip ring, said solute concentration determining instrument being connected to said brush so that said solute concentration determining instrument is substantially stationary while said rotor rotates so that concentration measurement can be made to determine the concentration of solute in the unsaturated solution during the application of force thereto.

* * * * *